United States Patent [19]

Yamaguchi et al.

[11] Patent Number: 4,709,155
[45] Date of Patent: Nov. 24, 1987

[54] FLAME DETECTOR FOR USE WITH A BURNER

[75] Inventors: Tetsurou Yamaguchi; Kohji Yamamoto; Kiichiro Honda, all of Kure, Japan

[73] Assignee: Babcock-Hitachi Kabushiki Kaisha, Tokyo, Japan

[21] Appl. No.: 800,178

[22] Filed: Nov. 20, 1985

[30] Foreign Application Priority Data

Nov. 22, 1984 [JP] Japan .............................. 59-246344
Nov. 30, 1984 [JP] Japan .............................. 59-251670
Nov. 30, 1984 [JP] Japan .............................. 59-251671
Dec. 12, 1984 [JP] Japan .............................. 59-260932

[51] Int. Cl.$^4$ ............................................. G08B 17/12
[52] U.S. Cl. .................................... 250/554; 340/578; 431/79
[58] Field of Search ................... 250/227, 339, 554; 340/578; 356/315; 431/79

[56] References Cited

U.S. PATENT DOCUMENTS 3,689,773  9/1972  Wheeler .............................. 250/554
4,328,488  5/1982  Yanai et al. ......................... 340/578
4,370,557  1/1983  Axmark et al. .................. 250/339 X Primary Examiner—Eugene R. LaRoche
Assistant Examiner—James C. Lee
Attorney, Agent, or Firm—Armstrong, Nikaido, Marmelstein & Kubovcik

[57] ABSTRACT

In a flame detector having an optical head, a plurality of light-taking optical fibers are arranged so as to provide different directions of fields of vision at their front ends. Therefore, the watching regions of burner flame has been widened, and even if the primary combustion zone moves back and forth with respect to the tip of the burner due to the change in load, the flame can be accurately detected providing high reliability. Junction optical fibers and wiring optical fibers are separately provided in addition to the light-taking optical fibers. Therefore, when one or more optical fibers are damaged, only the damaged optical fibers are required to be replaced with new ones providing cost reduction in maintenance. Two or more photosensitive elements having different sensitive wavelength regions are used. Therefore, various types of flames having various wavelengths can be effectively detected providing wider detection range when compared with conventional apparatus.

16 Claims, 33 Drawing Figures

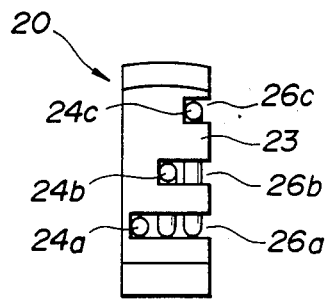
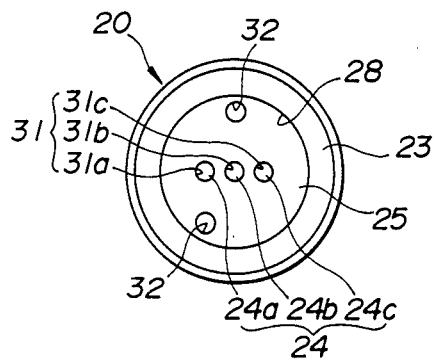
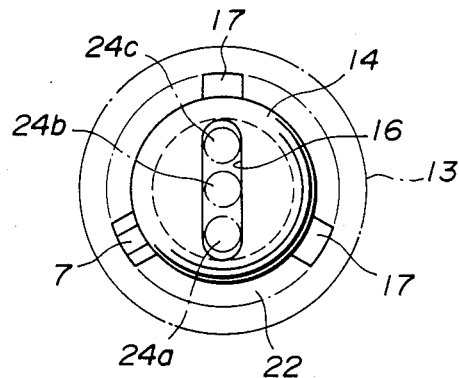
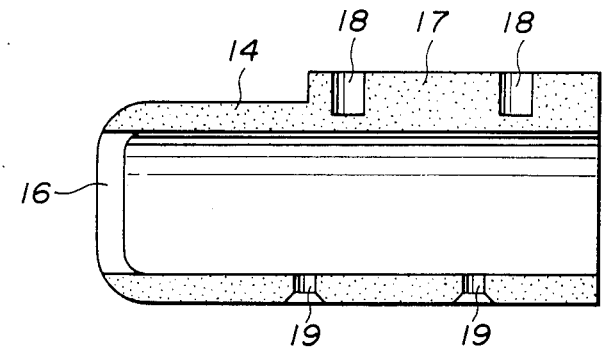

| Angle of Field of Vision | 0° | | 15° | | 30° | |
|---|---|---|---|---|---|---|
| Wavelength Range | Visible Light | IR Light | Visible Light | IR Light | Visible Light | IR Light |
| Channel | 1 | 2 | 3 | 4 | 5 | 6 |
| Threshold | 48 | 3496 | 54 | 3082 | 17 | 2873 |
| Deviation | 9 | 348 | 12 | 398 | 3 | 349 |
| Present Value | 53 | 3536 | 46 | 2735 | 16 | 2613 |
| Deviation | 9 | 182 | 8 | 44 | 3 | 58 |
| Interference Value | 145 | 1031 | 85 | 471 | 7 | 275 |
| Determination | 1 | 1 | 1 | 1 | 1 | 1 |
| | 1 | | 1 | | 1 | |
| | Now in Combustion State | | | | | |

| Angle of Field of Vision | 0° | | 15° | | 30° | |
|---|---|---|---|---|---|---|
| Wavelength Range | Visible Light | IR Light | Visible Light | IR Light | Visible Light | IR Light |
| Channel | 1 | 2 | 3 | 4 | 5 | 6 |
| Threshold | 48 | 3496 | 54 | 2664 | 17 | 2873 |
| Deviation | 9 | 348 | 12 | 398 | 3 | 349 |
| Present Value | 150 | 1210 | 88 | 453 | 12 | 274 |
| Deviation | 9 | 182 | 8 | 44 | 3 | 58 |
| Interference Value | 145 | 1031 | 85 | 471 | 7 | 275 |
| Determination | -1 | -1 | -1 | -1 | 0 | -1 |
| | -1 | | -1 | | -1 | |
| | Now in Extinction State | | | | | |

FLAME DETECTOR FOR USE WITH A BURNER

BACKGROUND OF THE INVENTION

This invention relates generally to flame detector provided to boilers and the like, and particularly to such flame detector which detects burner flame optically.

In various fuel combustion apparatus, such as large-sized boilers for factories or the like, it is important to detect accurately the state of combustion so as to ensure the safety and economy.

In the case of a boiler used for a power plant, it is desired that the reliability in detection of burner flame is further increased because of various circumferences, such as the increase in the number of burners caused from the tendency of increasing the capacity of boilers, the increase in the number of times of igniting and fire extinguishing caused from DSS (daily start-stop) operation, the adoption of the way of surpressing the generation of oxygen nitride (NOx) and the variation in the combustion state due to the diversification of used fuel.

Methods for detecting flame may be devided into two, one being ion method and the other being an optical method. In ion method, since flame electrode is used as a sensor, the flame detector cannot be used continuously for a long period of time, and therefore, such type flame detector is limited generally to flame detectors for use with igniting burners. On the other hand, optical flame detectors are arranged to detect combustion state and extinction state by detecting the intensity of radiated light from the flame, and are divided into two types, one being a system of detecting used wavelength and direct current light and the other being a system of determined flicker.

FIG. 31 shows a general structure of a conventional flame detector of optical type. As shown, one or more heat-resisting mirrors 103 are disposed within a hollow cylindrical light guiding tube 102 having an opening 101 at its side wall. Light ray 105 from unshown flame is led via the opening 101 into the light guiding tube 102, and is reflected at the mirror 102 to be incident on a sensor 104 such as a silicone photocell. Then the light is converted into an electrical signal to be outputted from the sensor 104 to be applied to an unshown control unit.

While this conventional flame detector is simple in construction, there is a drawback that the field of vision for flame detection is limited to a relatively narrow range. Since primary combustion zone where the brightness of the flame is high, moves back and forth relative to the tip of a burner due to the variation in load, such narrow field of vision for flame detection results in low accuracy in detection. Furthermore, such narrow field of vision makes it difficult to distinguish one flame of an objective burner from light of other flames. More specifically, in conventional arrangement of this type, the intensity of detected light is simply compared with a predetermined threshold provided for flame detection, and when the detected intensity is below the threshold, it is detrmined that there exists no flame, i.e the state of extinction, and on the other hand, when the detected intensity is above the threshold, then it is determined that there exists a flame, i.e. state of combustion, and such detection signal is fed to an alarm, a monitor and so on.

In more complex conventional flame detectors, the value of the threshold for the flame detection is changed in accordance with the sort of fuel to be combusted. However, only one threshold is used for each sort of fuel. Therefore, detection accuracy does not increase although various sorts of fuel can be used. Furthermore, detecting operation would rather be complex with such variable threshold.

Moreover, in actual flame detection, determination logic, in which higher intensity of flame light means combusting state, is not always correct because there occurs a phenomenon that higher intensity of flame light is detected in connection with a burner which is in extinction state.

This phenomenon will be described with reference to FIGS. 32 and 33. In the case of detecting whether an ignition burner 106 is in combustion state or extinction state by way of a flame detector 107, when the ignition burner 106 is in extinction state as shown in FIG. 32, a large amount of light from a flame F1 of a main burner 108 is detected by the flame detector 107, and the amount of light received by the sensor of the flame detector 107 becomes large. On the other hand, when the ignition burner 106 is in combustion state, the light of the flame F2 of the main burner 108 is shut off by the flame F1 of the ignition burner 106, and therefore, the amount of received light is reduced. For this reason, the above-mentioned determination logic is apt to result in erroneous determination with which a false signal is fed to fuel supply system or the like.

Such erroneous detection may occur not only between an ignition burner and a main burner but also between a plurality of burners disposed nearby such as in a cell burner.

SUMMARY OF THE INVENTION

The present invention has been developed in order to remove the above-described drawbacks inherent to the conventional flame detectors for use with burners.

It is, therefore, an object of the present invention to provide a new and useful flame detector for use with a burner, with which flame detection is accurately performed.

According to a feature of the present invention a plurality of light-taking optical fibers are supported so as to provide different directions of fields of vision at their front ends. Therefore, the watching regions of burner flame has been widened, and even if the primary combustion zone moves back and forth with respect to the tip of the burner due to the change in load, the flame can be accurately detected providing high reliability.

According to another feature of the present invention, junction optical fibers and wiring optical fibers are separately provided in addition to light-taking optical fibers. Therefore, when one or more optical fibers are damaged, only the damaged optical fibers are required to be replaced with new ones providing cost reduction in maintenance.

According to another feature of the present invention, two or more photosensitive elements having different sensitive wavelength regions are used. Therefore, various types of flames having various wavelengths can be effectively detected providing wider detection range when compared with conventional apparatus.

In accordance with the present invention there is provided apparatus for detecting flame for use with a burner, comprising: a light-taking head having a fiber supporting member, a plurality of light-taking optical fibers supported by said fiber supporting member so that respective front ends of said light-taking optical fibers have different directions of fields of vision, and a protecting pipe for receiving said light-taking fibers; photosensitive element means responsive to optical signals fed from said light-taking optical fibers for converting said optical signals into electrical signals, said photosensitive element means having a plurality of pairs of photosensitive elements where the number of the pairs equals the number of said plurality of light-taking optical fibers, said photosensitive elements in each pair having different sensitive wavelength ranges; a plurality of optical fibers for transmitting said optical signals from said light-taking head to said photosensitive elements, said plurality of optical fibers being respectively connected to said plurality of light-taking optical fibers; and a flame detecting unit responsive to said electrical signals.

BRIEF DESCRIPTION OF THE DRAWINGS

The object and features of the present invention will become more readily apparent from the following detailed description of the preferred embodiments taken in conjunction with the accompanying drawings in which:

FIGS. 4, 5 and 6 are respectively a side view, a front view and a rear view of a light-taking head included in the detector head of FIG. 3;

FIGS. 8 and 9 are respectively cutaway cross-sectional view and a front view of a protecting member;

The same or corresponding elements and parts are designated at like reference numerals throughout the drawings.

DETAILED DESCRIPTION OF THE INVENTION

The flame detector according to the present invention will be described in connection with an embodiment hereinbelow. For a better understanding of the present invention, the following description is divided into two parts A and B, A being the structure of the flame detector and B being the flame detection system or method.

[A] The Structure of Flame Detector

Figure 1:
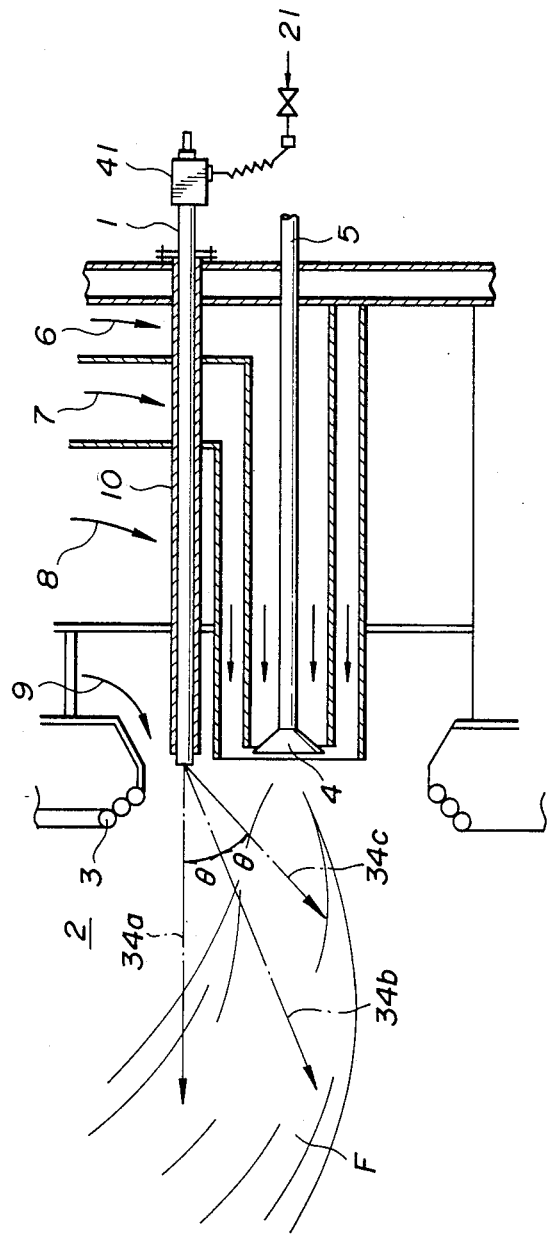
FIG. 1 is a partial cross-sectional view showing a flame detector according to the present invention disposed in a large-sized boiler.

Referring now to FIG. 1, disposing state of a flame detector within a large-sized boiler is shown by way of a partially cross-sectional view. The reference 1 indicates a detector head of the flame detector according to the present invention. The reference 2 is a furnace, 3 being a heat transmission pipe, 4 being a flame holder, 5 being a main burner, 6 being primary air, 7 being recirculating gasses, 8 being secondary air, 9 being tertiary air, and 10 being a sleeve. As illustrated the detector head 1 is disposed substantially parallel to the main burner 5, and its tip portion extends nearby a flame F formed by the main burner 5.

Figure 2:
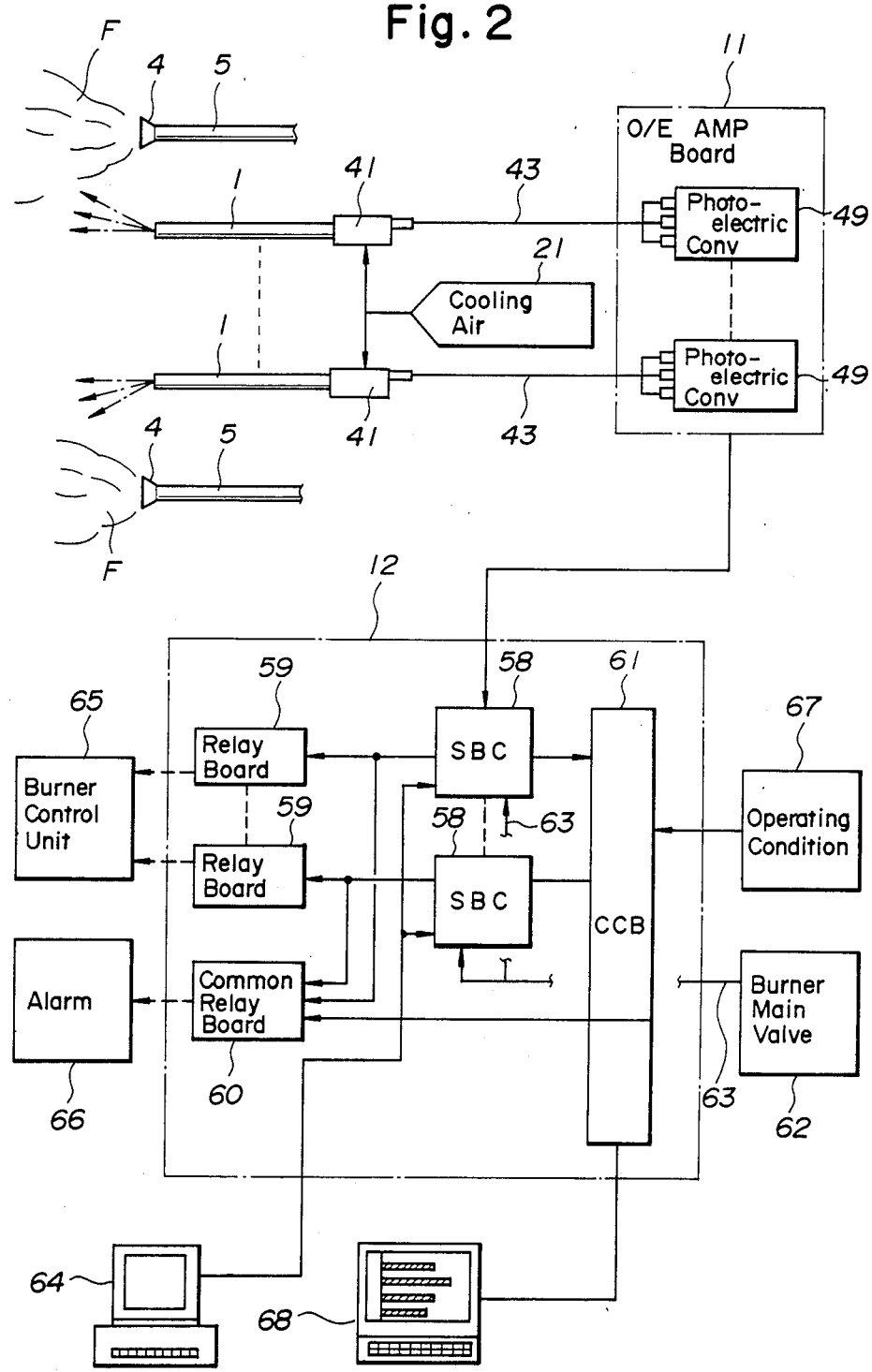
FIG. 2 is a schematic block diagram of the flame detector according to the present invention.

Although the detector head 1 is disposed above the main burner 5 in the illustrated example, the detector head 1 may be positioned below the main burner as shown in FIG. 2.

FIG. 2 is a block diagram of the flame detector according to the present invention. The flame detector generally comprises detector head(s) 1 as many as the number of burners 5, O/E amplifier board 11, and a flame detector control unit 12. The detailed structure of the O/E amplifier board 11 and the flame detector control unit 12 will be described hereinlater.

Figure 3:
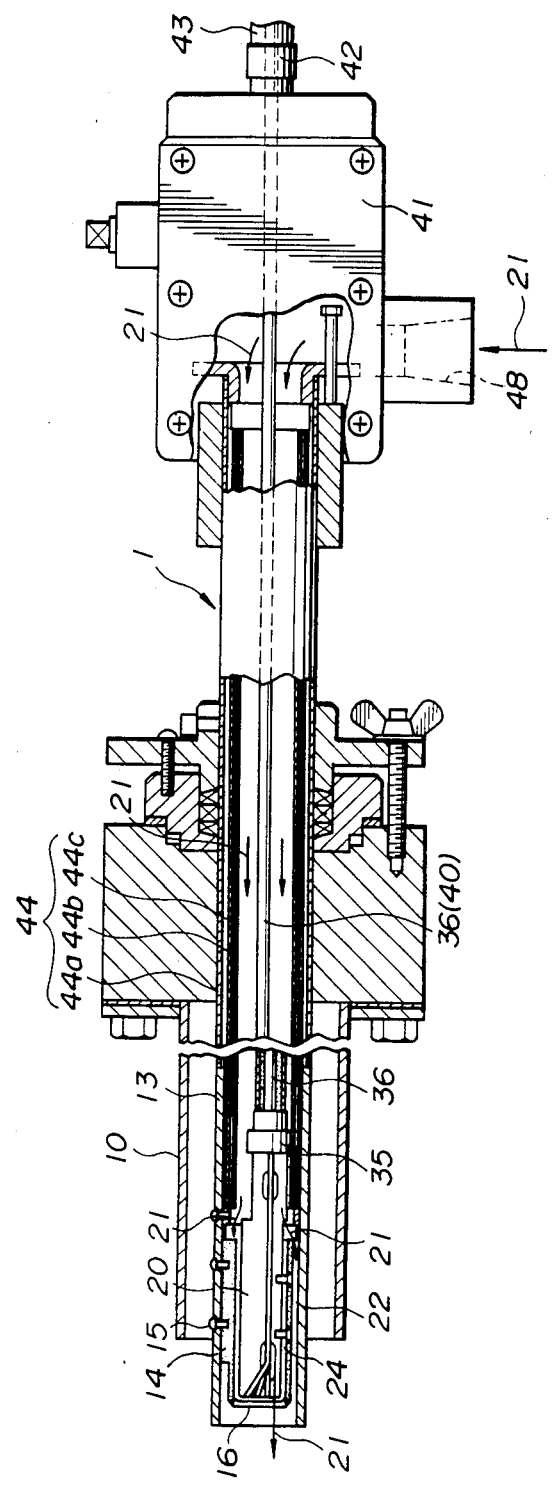
FIG. 3 is a cross-sectional view showing a main part of a detector head included in the flame detector of FIG. 2.
Figure 4:
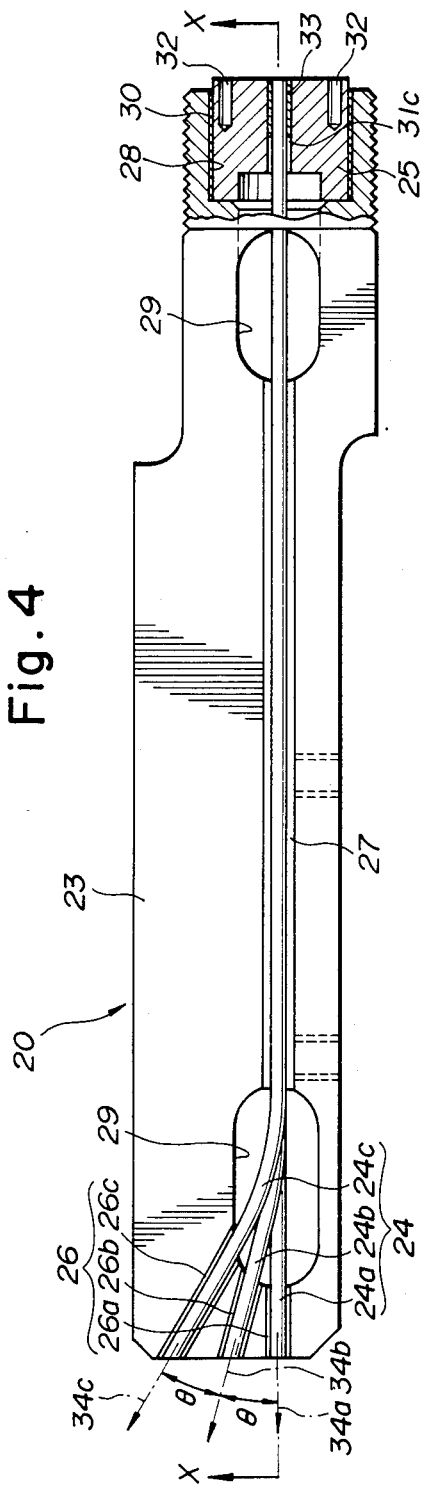
Figure 7:
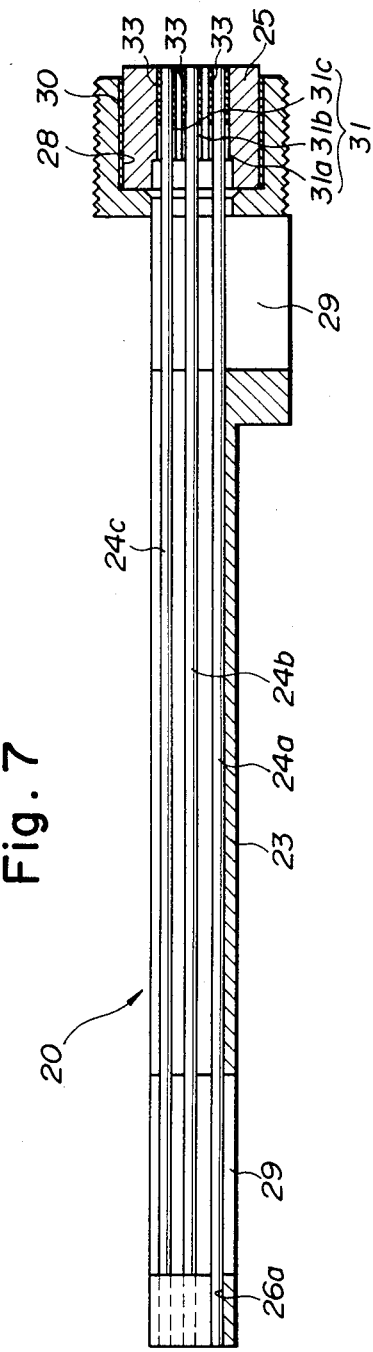
FIG. 7 is a cross-sectional view taken along line X—X in FIG. 4.

Now the structure of the detector head 1 will be described. FIG. 3 is a cross-sectional view showing a main part of the detector head 1, and FIGS. 4, 5 and 6 are respectively a side view, a front view and a rear view of a light-taking head included in the detector head 1. FIG. 7 is a cross-sectional view taken along line X—X in FIG. 4, and FIGS. 8 and 9 are respectively cutaway cross-sectional view and a front view of a protecting member.

In FIG. 3, the reference 13 is an outer cylinder, which is made of heat-resistive and corrosion-resistive material, such as stainless steel, and a protecting member 14 is attached by screws to a front end of the outer cylinder 13. This protecting member 14 is made of a material, such as a ceramic, which has superior heat resistivity, and this protecting member 14 is formed to have a cap-like shape. At a front end of the protecting member 14 is made a slit 16 for detecting flame light. On the outer surface of the protecting member 14 is formed a spacer 17 in a longitudinal direction of the protecting member 14, and screw holes 18 used for attaching are made in the spacer 17 as seen in FIG. 8. The reference 19 in FIG. 8 indicates screw holes used for attaching the light-taking head 20. As shown in FIGS. 3 and 9, when attaching the protecting member 14 to the outer cylinder 13, there is provided a space 22 between the protecting member 14 and the outer cylinder 13 because of the provision of the spacer 17 so that cooling air 21 flows.

As shown in FIG. 3, a front end of the light-taking head 20 is inserted into the hollow portion of the protecting member 14 and is screwed to be secured. As shown in FIGS. 4 through 7, the light-taking head 20 comprises three optical fibers 24 each made of silica glass for instance, an optical fiber supporter 23, and a ferrule 25. The optical fiber supporter 23 is made of a heat-resisting material, such as stainless steel, ceramic or the like. As seen in FIGS. 4 and 5, tip portion supporting grooves 26 which extend in three directions, are formed in the optical fiber supporter 23 around front end thereof. In a middle portion of the optical fiber supporter 23 is formed a guide groove 27, and at a rear end thereof is formed a recessed ferrule-receiving portion 28. Two through-holes 29 are formed in the optical fiber supporter 23 so that each through-hole penetrates the optical fiber supporter 23 from one side to the other side around a front portion and a rear portion of the guide groove 27.

The ferrule 25 is also made of a heat-resistive material such as stainless steel, ceramic or the like, and is fitted, as shown in FIGS. 4 and 7, in the ferrule-receiving portion 28 via an adhesive 30. As shown in FIGS. 6 and 7, at the center of the ferrule 25, are formed three parallel inserting holes 31, and two positioning holes 32 are made at positions slightly spaced apart from the inserting holes 31.

The three optical fibers 24 are respectively called first, second and third optical fibers 24a, 24b and 24c hereinafter. The first optical fiber 24a for taking light is inserted into the inserting hole 31a of the ferrule 25 with an adhesive 33 being painted on the rear end of the first optical fiber 24a. Then, a middle portion of the first optical fiber 24a is received in the guide groove 27, while the front end portion thereof is inserted into a supporting groove 26a. Similarly, the second optical fiber 24b is inserted into the inserting hole 31b of the ferrule 25 with an adhesive 33 being painted on the rear end of the second optical fiber 24b. Then, a middle portion of the second optical fiber 24b is received in the guide groove 27, while the front end portion thereof is inserted into a supporting groove 26b. Then the third optical fiber 24c is inserted into the inserting hole 31c of the ferrule 25 with an adhsive 33 being painted on the rear end of the third optical fiber 24c. Then, a middle portion of the third optical fiber 24c is received in the guide groove 27, while the front end portion thereof is inserted into a supporting groove 26c. After the rear ends of the first through third optical fibers 24a, 24b and 24c are adhered and secured to the ferrule 25, the rear end of the ferrule 25 is polished so as to be flush with the rear ends of the first through third optical fibers 24a, 24b and 24c.

As shown in FIG. 4, the first supporting groove 26a extends so as to be in line with the guide groove 27, the second supporting groove 26b being positioned at an inclination angle $\theta$ which is approximately 15° with respect to the first supporting groove 26a, and the third supporting groove 26c being positioned at an inclination angle $\theta$ which is approximately 15° with respect to the second supporting groove 26b. The front end portions of the first to third optical fibers 24a, 24b and 24c are respectively inserted into the first to third supporting grooves 26a, 26b and 26c. With this arrangement, the first optical fiber 24a has a field of vision 34a whose inclination angle is 0°, the second optical fiber 24b having a field of vision 34b whose inclination angle is approximately 15°, and the third optical fiber 24b having a field of vision 34c whose inclination angle is approximately 30°. In this way three different fields of vision are obtained so that a single field of vision obtained by a conventional flame detector has been widened. Although the second and third optical fibers 24b and 24c are respectively bent or curved, it is confirmed that bending of an optical fiber up to approximately 30° does not severely affect on the light transmission efficiency.

As seen in FIG. 5, the supporting grooves 26a, 26b and 26c have different depths respectively such that the depth becomes deeper from the third supporting groove 26c toward the first supporting groove 26a. More specifically, the difference in depth between consecutive supporting grooves 26a and 26b or 26b and 26c is more than the outer diameter of each of the optical fibers 24. Since the three optical fibers 24a, 24b and 24c are received in the guide groove 27 to be parallel to each other, the front end portion of the optical fibers 24a, 24b and 24c can be supported without unnatural twist when received in the supporting grooves 26a to 26c having different depths as described in the above.

The width of the supporting grooves 26 and the guide groove 27 is designed so that the optical fibers 24 can be smoothly inserted. In other words, the width of these grooves 26 and 27 is made larger than the outer diameter of each of the optical fibers 24 so that unnatural strain is not applied due to expansion error of the supporting member 23 and the optical fibers 24.

The light-taking head 20 having the above-mentioned structure is connected via a connector 35 to three junction optical cables 36. The front ends of the junction optical fibers 36 are secured to the connector 35 in an in-line fashion, and the front ends are exposed at an end surface of the connector 35. At the front end of the connector 35 are provided two pins. These pins are to be fitted into holes 32 shown in FIGS. 3 and 6 so that the connector 35 is telescopically engaged with the rear surface of the supporting member 23. As a result, a rear end surface of the first optical fiber 24a faces the front end surface of the first junction optical fiber 36a, a rear end surface of the second optical fiber 24b facing the front end surface of the second junction optical fiber 36b, and a rear end surface of the third optical fiber 24c facing the front end surface of the third junction optical fiber 36c.

Figure 10:
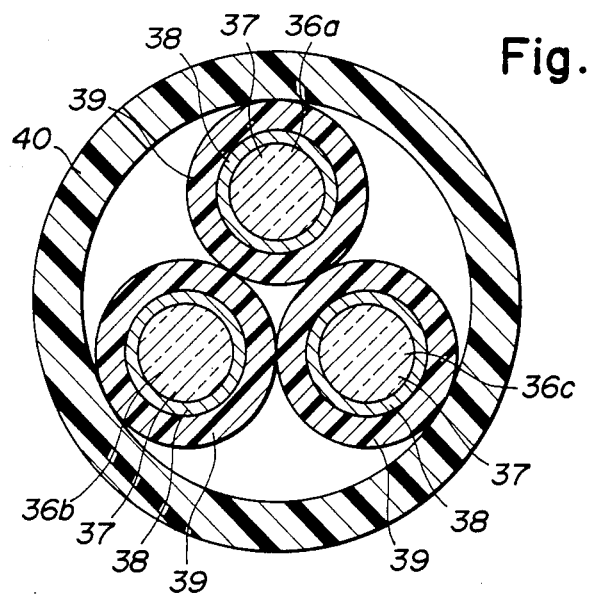
FIG. 10 is an enlarged cross-sectional view of junction optical fibers.

FIG. 10 is an enlarged cross-sectional view of the junction optical fibers 36. Each of the junction optical fibers 36 has three-layer structure and comprises a core 37, a cladding 38 provided around the core 37, and a protecting layer 39 provided around the cladding 38. Three junction optical fibers 36 are all together received in a tube 40. The above-mentioned protecting layer 39 and the tube 40 are provided so as to give mechanical characteristic such as bending characteristic of the junction optical fibers 36, and are made of a material, such as fluoroplastics, polyamide resin, silicone resin, or vinyl resin. Furthermore, a filling layer may be provided between the junction optical fibers 36 and the tube 40.

As shown in FIG. 3, the front ends of the junction optical fibers 36 are connected via the connector 35 to the light-taking head 20, while rear ends thereof extend to a cooling air box 41 to be connected via a connector 42 to wiring optical fibers 43. A middle portion of the junction optical fibers 36 is received in a protecting pipe 44.

Figure 11:
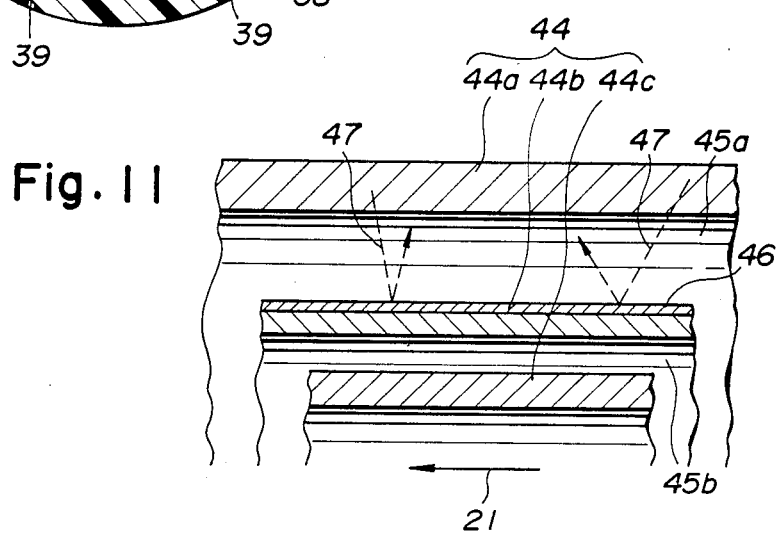
FIG. 11 is an enlarged partial cross-sectional view of a protecting pipe.

FIG. 11 is an enlarged partial cross-sectional view of the protecting pipe 44. The protecting pipe 44 has three-layer structure and comprises a first protecting pipe 44a having a large diameter, a second protecting pipe 44b having a diameter smaller than that of the first protecting pipe 44a and a third protecting pipe 44c having a diameter smaller than that of the second protecting pipe 44b. These three protecting pipes 44a, 44b and 44c are coaxially arranged with spaces 45a and 45b therebetween. The outer surface of the second protecting pipe 44b has a mirror-finished surface 46 as shown. With the provision of the mirror-finished surface 46 a considerable amount of heat ray or flux 47 transmitted from the first protecting pipe 44a is reflected. In addition the space 45a between the first and second protecting pipes 44a and 44b and the other space 45b between the second and third protecting pipes 44b and 44c function as heat-insulating layers. Cooling air 21 is arranged to flow within the third protecting pipe 44c. Undesirable thermal influence on the junction optical fibers 36 can be effectively prevented by the above-mentioned heat reflection at the mirror-finished surface 46, heat insulation by the double insulators 45a and 45b, and by the flow of the cooling air 21.

As shown in FIG. 3, the cooling air box 41 comprises an inlet 48 for the cooling air 21. The cooling air 21 introduced from the inlet 48 flows forward through inside the protecting pipe 44 (the third protecting pipe 44c) as indicated by arrows so as to flow via a space between the light-taking head 20 and the protecting member 14 and then to be gushed out from the slit 16 of the protecting member 44. A portion of the cooling air 21 passed through the protecting pipe 44 gushes out from a gap between the protecting member 14 and the outer cylinder 13. In this way, with the flow of cooling air 21 not only the thermal undesirable influence on the light-taking optical fiber 24 as well as the junction optical fiber 36 can be suppressed but also a light-taking end surface of the light-taking optical fiber 24 is prevented from becoming dirty. In the case that the inner diameter of the outer cylinder 13 is 32 millimeters, it is sufficient if the flowrate of the cooling air 21 equals 0.3 m³/min or more.

Figure 12:
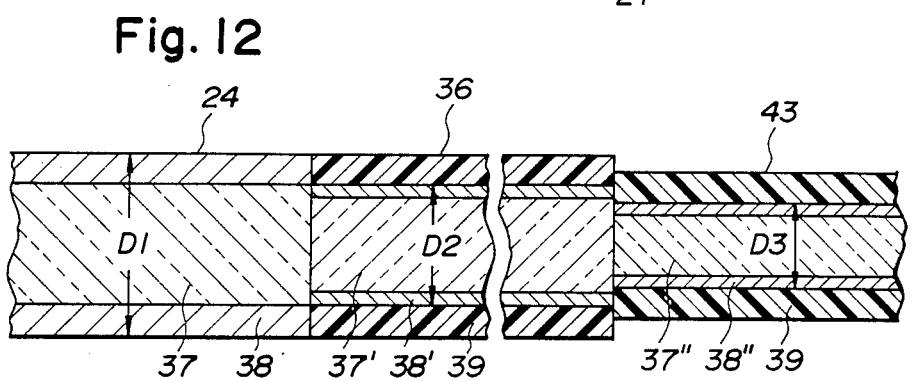
FIG. 12 is an enlarged cross-sectional view showing how the light-taking optical fibers, the junction optical fibers and the wiring optical fibers face adjacent one.

The wiring optical fibers 43 to be connected to the rear ends of the junction optical fibers 36 also includes three optical fibers which respectively face end surfaces of the junction optical fibers 36 at the connector 42. Each of the wiring optical fibers 43 comprises a core 37″, a cladding 38″ provided around the core 37″, and a protecting layer 39 provided around the cladding 38 as shown in FIG. 12 in the same manner as the junction optical fibers 36. Three wiring optical fibers 43 are all together received in a tube.

FIG. 12 is an enlarged cross-sectional view showing how the light-taking optical fibers 24, the junction optical fibers 36 and the wiring optical fibers 43 face adjacent one. As illustrated, no protecting layer 39 is provided to the light-taking optical fiber 24. This is because it is advantageous in view of heat-resistivity to have no protecting layer 39 which is made of an organic material mentioned hereinabove. The outer diameter D1 of the cladding 38 of the light-taking optical fibers 24, the outer diameter D2 of the cladding 38′ of the junction optical fiber 36, and the outer diameter D3 of the cladding 38″ of the wiring optical fibers 43 are different from each other. In this embodiment, D1=800 μm, D2=400 μm and D3=200 μm so that there is a relationship of D1>D2>D3. Using optical fibers of such different diameters makes easy connection thereof since light transmission is effectively effected even though the center of a smaller diameter optical fiber is deviated slightly from the center of an adjacent larger diameter optical fiber when these optical fibers are connected to each other.

When the diameter of the light-taking optical fibers 24 is made largest among these three sorts of optical fibers, then it is possible to increase the amount of light to a possible maximum value. Since the wiring optical fibers 43 extend over a relatively long distance from the cooling air box 41 to a control unit, there may be a number of places where the wiring optical fibers 43 are curved or bent. Therefore, the diameter of the wiring optical fibers 43 is set to the minimum one in this embodiment so that bending characteristic is the best.

As shown in FIG. 2, rear ends of the wiring optical fibers 43 are connected to respective photoelectric converters 49 of the O/E board 11, where the number of the photoelectric converters 49 is the same as the number of the detector heads 1.

Figure 13:
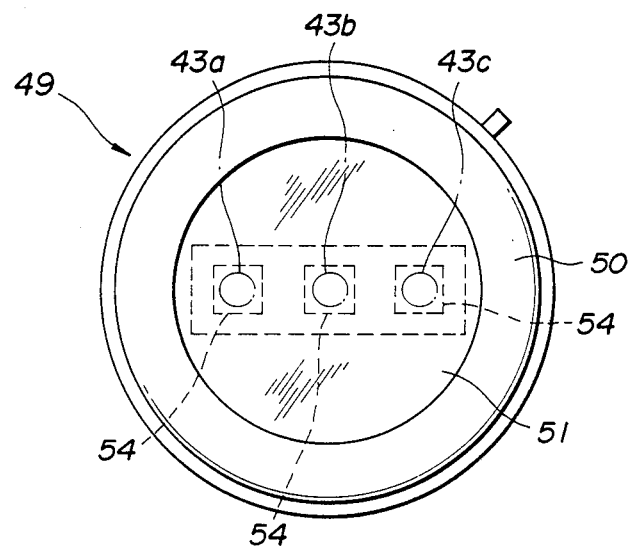
FIGS. 13 and 14 are respectively a top plan view and a cross-sectional side view of a photoelectric conveter.
Figure 14:
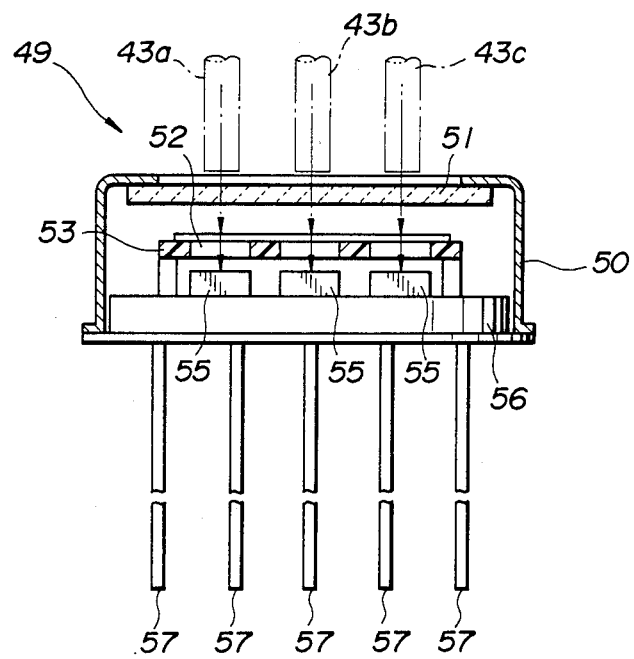

FIGS. 13 and 14 are respectively a top plan view and a cross-sectional side view of the photoelectric converter 49. The photoelectric converter 49 comprises a casing 50 having an open end, a transparent glass plate 51 provided to the open end, a supporter 53 having three through-holes 52 arranged in line, three visible light sensitive elements 54 made of silicone photodiodes for instance, which are arranged on the supporter 53 (see FIG. 13), three infrared light sensitive elements 55 made of lead sulfide photoconductors for instance, which are positioned below the through-holes 52, a circuit board 56 for supporting the supporter 53 and the infrared light sensitive elements 55, and terminal pins 57 protruding from the circuit board 56.

The above-mentioned visible light sensitive elements 54 and the infrared light sensitive elements 55 are arranged in line respectively so as to form three pairs of photosensitive elements respectively opposing the rear ends of the first through third wiring optical fibers 43a, 43b and 43c as shown in FIG. 14.

Figure 15:
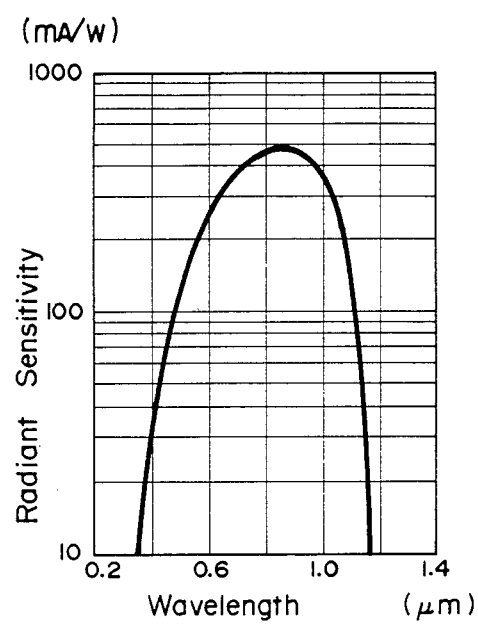
FIG. 15 is a wavelength response diagram of a silicone photodiode.
Figure 16:
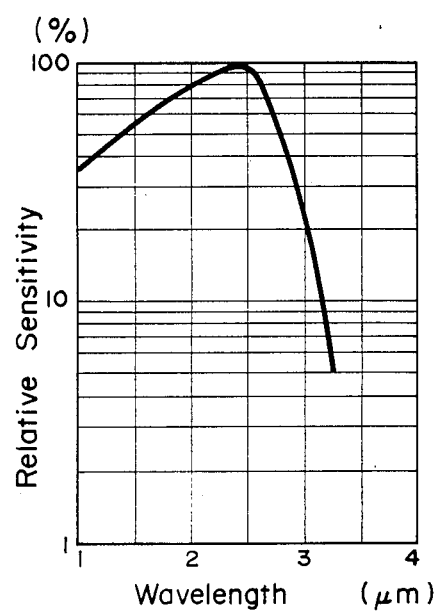
FIG. 16 is a wavelength response diagram of a lead sulfide photoconductor.

FIG. 15 is a wavelength response diagram of a silicone photodiode, and FIG. 16 is a wavelength response diagram of a lead sulfide photoconductor. As will be recognized from these diagrams the silicone diode has a detection sensitivity range of approximately 0.5 to 1.0 μm, whereas the lead sulfide photoconductor has a detection sensitivity range of approximately 1 to 3 μm.

A short-wavelength component of the optical signal led from the flame F via the wiring optical fibers 43 is detected by the visible light sensitive elements 54, and then a long-wavelength component of the same is detected by the infrared light sensitive element 55. In this way, by the combination of the visible light sensitive elements 54 and the infrared light sensitive elements 55 the detection wavelength range has been widened. As a result, it is now possible to detect various sorts of flames resulted from various sorts of fuels, such as petroleum, coal, or gas.

The flame detector according to the present invention has the above-mentioned structure, and now the way of detecting flame using the above-mentioned flame detector will be described.

[B] Method of Flame Detection

There are three different methods for flame detection according to the present invention. Prior to describing these methods, the general structure of the flame detector control unit 12 will be described with reference to FIG. 2.

The flame detector control unit 12 comprises SBC (single-board control) circuits for determination which are provided in correspondence with the photoelectric converters 49, relay board 59 respectively connected to respective SBC circuits 58, a common relay board 60, a CCB (communication control board) 61 for communication. To the SBC circuits 58 is fed a valve open-close signal 63 from a burner main valve 62. The respective SBC circuits 58 are connected to an adjusting tool 64 which may comprise a microcomputer and peripheral equipment. The relay boards 59 are both connected to a burner control unit 65. The common relay board 60 is connected to an alarm device 66 which may comprise a buzzer, lamp or the like. To the CCB 61 are fed various operating conditions 67 for the determination of flame detection, and the CCB 61 is also connected to a host computer 68.

While the general structure of the flame detector control unit 12 has been described in the above, the block diagram of FIG. 2 may be slightly changed depending on which detection method is used.

Figure 18:
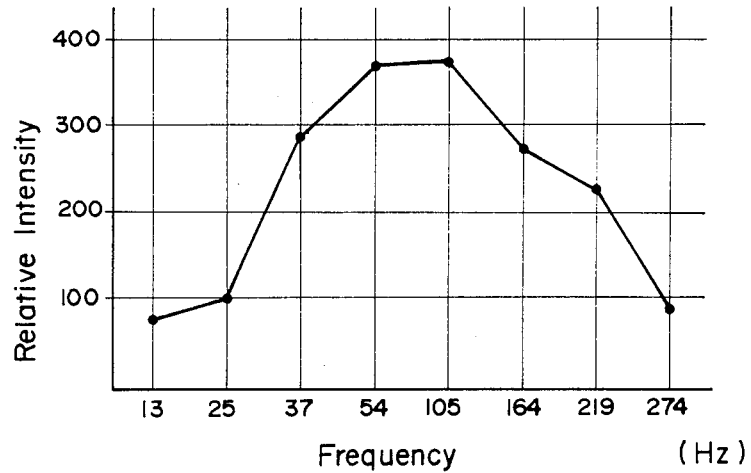
FIG. 18 is a frequency distribution diagram showing an example of an output from a Fourier transformer on a monitor.
Figure 17:
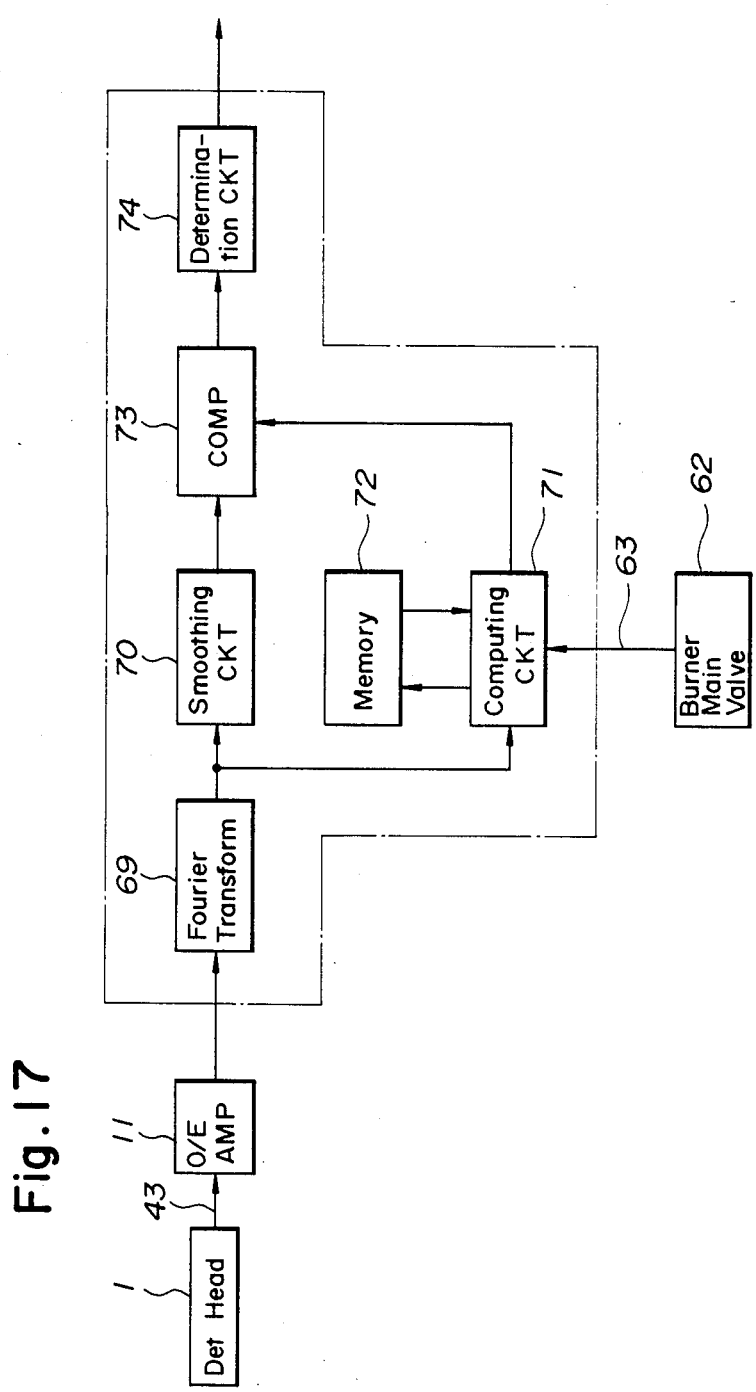
FIG. 17 is a control block diagram for the determination of the presence or absence of flame.
Figure 19:
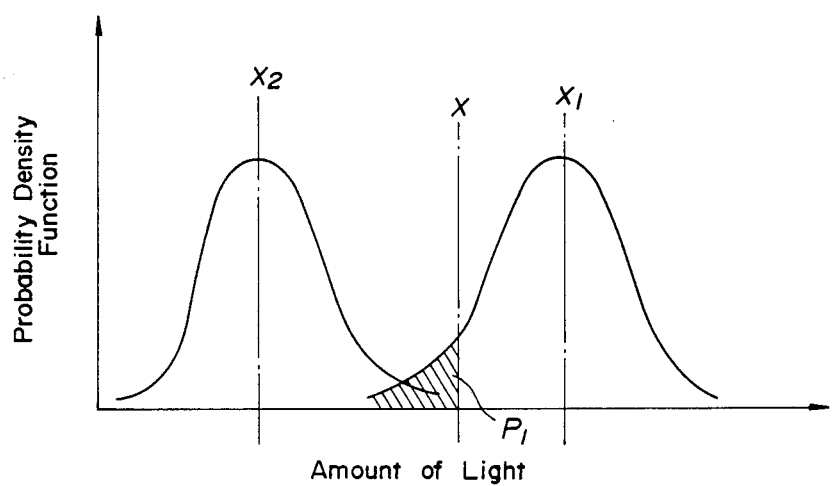
FIGS. 19 and 20 are characteristic diagrams showing the relationship between the amount of light and probability density function.
Figure 20:
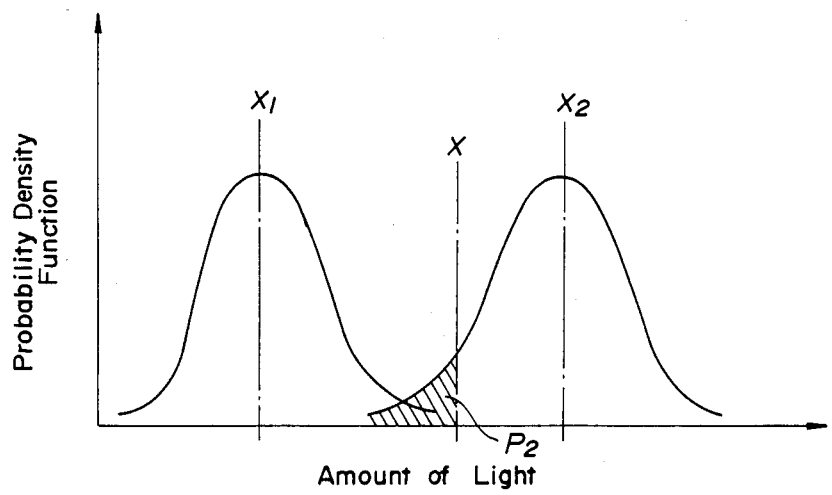
Figure 21:
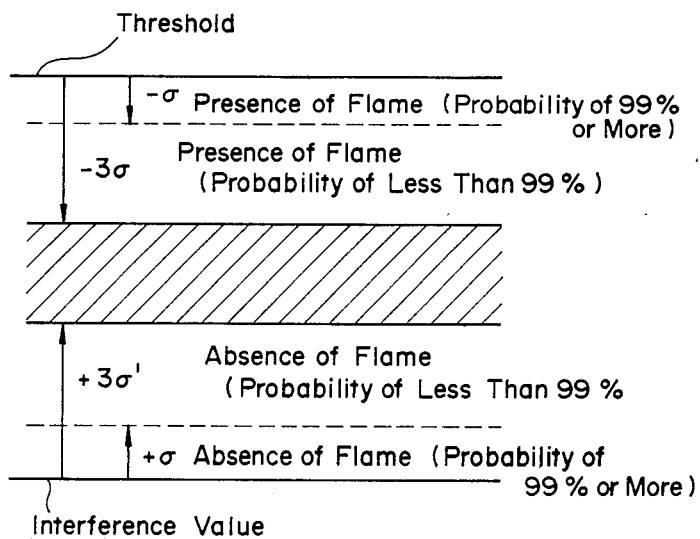
FIG. 21 is a diagram showing how the presence and absence of a flame is determined.
Figure 22:
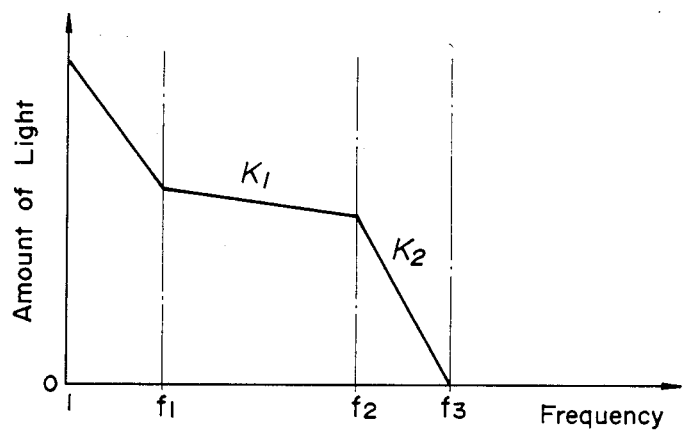
FIGS. 22 and 23 are characteristic diagrams showing the relationship between the amount of light and frequency at the time when the amount of light varies.
Figure 23:
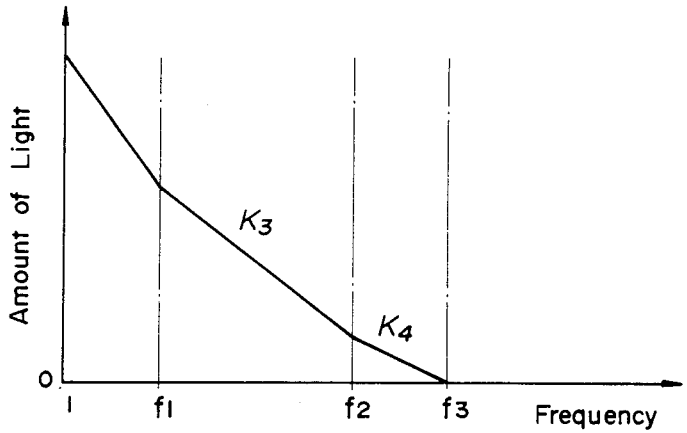

The first method of flame detection will now be described with reference to FIGS. 17 through 22. FIG. 17 is a control block diagram for the determination of the presence or absence of flame, FIG. 18 is a frequency distribution diagram showing an example of an output from a Fourier transformer on a monitor, FIGS. 19 and 20 are characteristic diagrams showing the relationship between the amount of light and probability density function, FIG. 21 is a diagram showing how the presence and absence of a flame is determined, FIGS. 22 and 23 are characteristic diagrams showing the relationship between the amount of light and frequency at the time when the amount of light varies.

As shown in FIG. 17, the optical signal transmitted from the detector head 1 via the wiring optical fiber 43 is inputted to the O/E amplifier board 11 to be converted into a digital signal and is amplified at a given rate. The digital signal is inputted to the Fourier transformer 69 to be converted into magnitudes of respective frequencies. One example of an output signal from the Fourier transformer 69 shown on a monitor is seen in FIG. 18. The output signal from the Fourier transformer 69 is fed to a smoothing circuit 70 and to a characteristic value computing unit 71 respectively.

In the characteristic value computing unit 71, prior to computing a characteristic reference value on the basis of inputted signals, the characteristic of flame to be detected is computed in accordance with a learning program and the result of computation is stored in a memory 72. Since the presence and absence of flame cannot be determined at the time of learning, it is regarded that flame is present when valve open-close signal 63 fed to the characteristic value computing unit 71 indicates open state so as to learn using the output signal from the Fourier transformer 69. The result of computation is then stored into the memory 72 at an address corresponding to the presence of flame. On the contrary, when the valve open-close signal indicates closed state, it is regarded that flame is absent, and learning is performed using the output signal from the Fourier transformer 69. The result of computation is then stored into the memory 72 at an address corresponding to the absence of flame.

In the above the characteristic reference value computed by the characteristic value computing unit 71 means an average value and deviation both computed statistically.

When the value of the result of computation hardly changes after learning is repeatedly performed for a given period of time, then it is regarded that learning is terminated and the signal from the Fourier transformer 69 is fed to the smoothing circuit 70 and to the characteristic value computing unit 71 (learning is repeatedly peformed during flame detecting operation).

Now computing process in the characteristic value computing unit 71 will be described. In this computing unit 71, an average value and deviation is computed using the signal from the Fourier transformer 69 related to detected flicker. Namely, assuming that an output from the smoothing circuit 70, which will be hereinlater described, is expressed in terms of X, when the valve open-close signal 63 from the burner main valve 62 indicates open state, an average value $X_1$ and deviation $\sigma_1$ of the amount of light are obtained by reading out the characteristic value indicating the presence of flame, which has been obtained through learning, from the memory 72, and the computed values are written into the memory 72. When the open-close signal of the burner main valve 62 indicates closed state, an average value $X_2$ and deviation $\sigma_2$ of the amount of light are obtained by reading out the characteristic value indicating the absence of time, which has been obtained through learning, from the memory 72, and the computed values are written into the memory 72.

It is significant in view of statistics to assume that the amount of light during combustion is of normal distribution when the entire combustion system such as a boiler is stable. Since the characteristic value of the light amount by a given instant ought to follow probability distribution of a group sampled from a population of normal distribution, it is expected that the characteristic value follows t-distribution (Student distribution).

When a random variable Y follows t-distribution, it is possible to obtain the probability that the random variable belongs to the group using the deviation of the random variable Y from the average value. Therefore, it is possible to obtain the probability $P_1$ (probability of being in combustion state) that the present value X (output value from the smoothing circuit 70) belongs to a group of combustion period and the probability $P_2$ (probability of being in extinction state) that the present value X belongs to the group of extinction period.

On the other hand, the smoothing circuit 70 outputs a signal which has been smoothed with noise components being removed, while the characteristic value computing unit 71 produces a characteristic value signal with the above-mentioned computation. These signals are fed to the comparator 73 to be compared with each other on the basis of probability theory and are processed. This process will be described with reference to FIGS. 19 through 21.

FIG. 19 is a diagram of characteristic in the case of detecting light amount where the light amount on combustion is larger than that on extinction with the relationship of $X_1 > X_2$, and FIG. 20 is a diagram of characteristic in the case of detecting light amount where the light amount on extinction is larger than that on combustion with the relationship of $X_1 < X_2$. In FIG. 19, the probability $P_1$ of combustion with the present value X corresponds to a portion indicated by hatching. In a similar manner, the probability $P_2$ of noncombustion can also be obtained from FIG. 20. This will be further described with reference to FIG. 21. When a threshold is set in connection with $X_1$ and an interference value is set in connection with $X_2$ where a deviation of the threshold and the deviation of the interference value are respectively expressed in terms of $\sigma$ and $\sigma'$, then the presence and absence of flame can be determined as the probability of the presence of flame with $-\sigma$ is 99% or more, the probability of the presence of flame with $-3\sigma$ is less than 99%, the probability of the absence of flame with $+\sigma'$ is 99% or more, and the prabability of the absence of flame with $+3\sigma'$ is less than 99%.

In the case of FIG. 20, the probability $P_2$ that combustion does not take place with the present value X corresponds to the hatched area, and the probability $P_2$ that combustion takes place can be obtained in a simmilar manner.

The determination circuit 74 of FIG. 17 is used to compare the magnitude of the probability $P_1$ and the magnitude of the probability $P_2$ with each other and to determine the presence or absence of flame through the method shown in FIG. 21. As a result of the determination, a determination signal is outputted from the determination circuit 74.

In the case that the difference between the probablity $P_1$ and the other probability $P_2$ is very small or equal to each other because the amount of light has varied due to some reasons, then the reliability in the determination performed in the above-mentioned way is not necessarily high. In this case, the following logic is used for accurate detection of the presence and absence of flame.

FIG. 22 shows light amount variation with respect to frequency in the case of the presence of flame, while FIG. 23 shows light amount variation with respect to frequency in the case of the absence of flame. From the comparison between these two diagrams, it is apparent that the variation rate $K_2$, i.e. the slope of the curve, between frequencies $f_1$ and $f_2$ in the case of the presence of flame (FIG. 22) is larger than the variation rate $K_3$ of the same in the case of the absence of flame (FIG. 23), namely $K_1 < K_3$. On the other hand, in a range between frequencies $f_2$ and $f_3$, the slope $k_2$ in the case of the presence of flame is larger than the slope $K_4$ in the case of the absence of flame, namely $K_2 > K_4$. Using these characteristic determination of the presence of flame is made when it is difficult to finally determine whether flame is present or not using the above-mentioned determination.

Figures 24, 25:
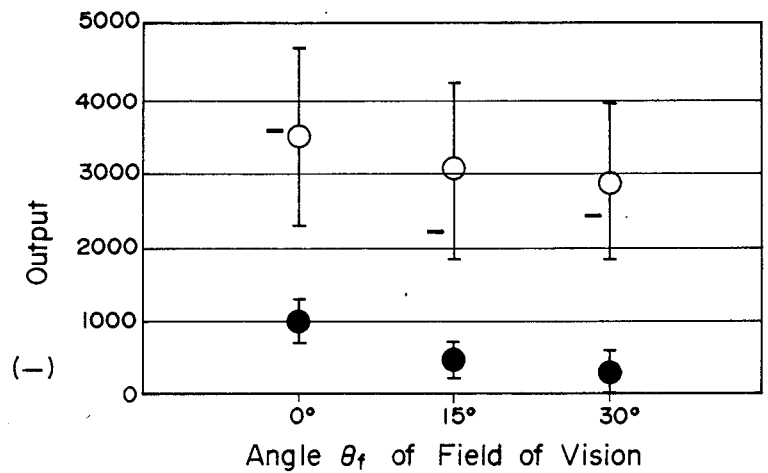
FIG. 24 is a diagram showing monitored characteristic value and present value both computed through learning.
FIGS. 25 and 26 are diagrams showing an example of the determination of the presence or absence of flame.
Figures 26, 27:
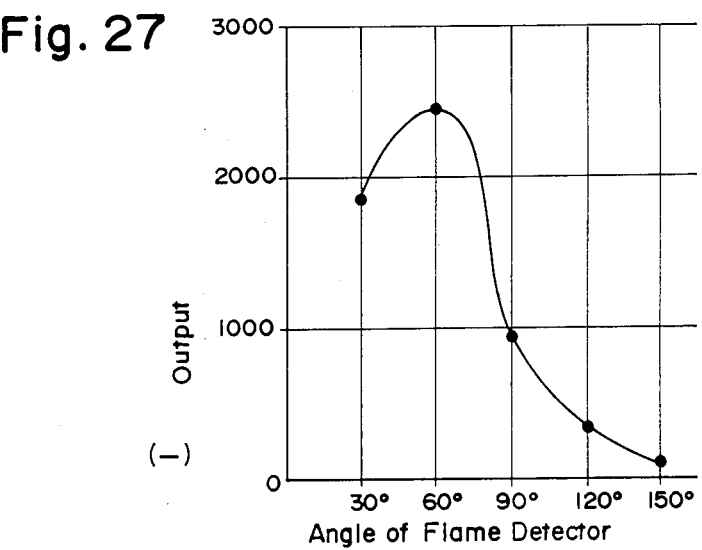
FIG. 27 is a characteristic diagram showing the relationship between the angle of the flame detector with respect to the burner and the flame detection output.

Now the second method of flame detection will be described with reference to to FIGS. 24 through 26. FIG. 24 is a diagram showing monitored characteristic value and present value both computed through learning. FIGS. 25 and 26 are diagrams showing an example of the determination of the presence or absence of flame.

FIG. 24 shows output signal characteristic obtained by the aforementioned infrared light sensitive elements 55 where the characteristic is shown in connection with the three fields of vision of different angles, i.e. 0°, 15° and 30°. In FIG. 24, the position indicated at a reference ○ shows threshold values obtained through learning, the position indicated at a reference ● shows the interference value, a line passing through the references ○ and ● shows deviations ($3\sigma$), and the position indicated at a reference — shows present values.

In this detection method, average values (thresholds and interference values) and their deviations are computed through self learning with data being taken in advance in the same manner as in the above-mentioned first method, and then the flame level (present value) detected at present time is computed using these characteristic values. Although combustion probability $P_1$ and noncombustion probability $P_2$ are obtained from the present value so as to compare the magnitude thereof with each other in the above-mentioned first detection method, such complex computation is not performed in the second detection method, and it is determined whether the present value is within the deviation of the threshold or within the deviation of the interference value or not. More specifically, when the present value is within the deviation of the threshold, it is determined that the burner is in combustion state. Then the determination in connection with respective channels results in "1" as shown in FIG. 25, and overall result throughout three angles of field of vision of 0°, 15° and 30° becomes "NOW IN COMBUSTION STATE". On the other hand, if the the present value is within the deviation of the interference value, it is determined that the burner is "NOW IN EXTINCTION STATE", and the result of detemination becomes "−1" as shown in the column of channels 1–4 and 6 in FIG. 26. Furthermore, if the present value is neither within the deviation of the threshold nor within the deviation of the interference value, the determination becomes "NOW IN EVEN STATE" and the result becomes "0" as in channel 5 of FIG. 26.

FIGS. 24 through 26 show examples obtained from gas burning flame, and since the level of visible light is low in the case of gas burning flame, the presence of flame is determined using infrared wavelength region. Therefore, even if the above-mentioned reserved determination "0" is obtained as in channel 5 in FIG. 26, the result of channel 6 is used so as to obtain overall determination of "NOW IN COMBUSTION STATE".

As shown in FIGS. 25 and 26, in the second detection method the determination is combustion, extinction or even is made first in connection with respective channels, and then determination to be adopted is determined in each field of vision considering used sort of fuel as described in the above. Then final overall determination is made through decision by majority throughout all the fields of vision.

Figure 28:
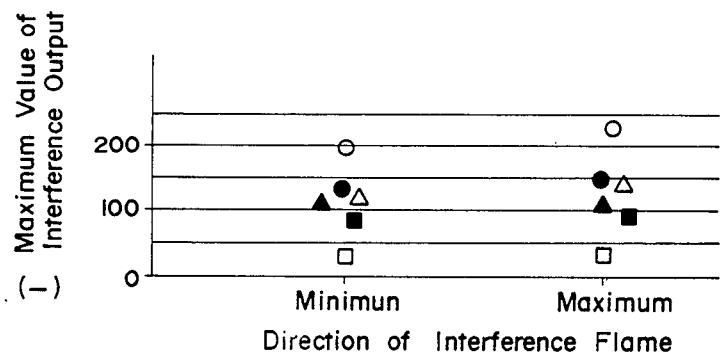
FIG. 28 is a characteristic diagram showing the relationship between the direction of interference flame and maximum value of interference output.
Figure 29:
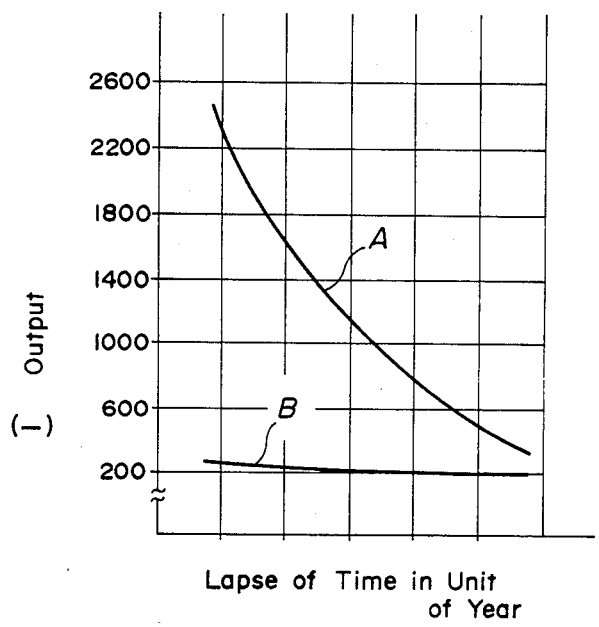
FIG. 29 is a characteristic diagram showing the variation of detection output in connection with self-flame and interference flame with respect to lapse of time.
Figure 30:
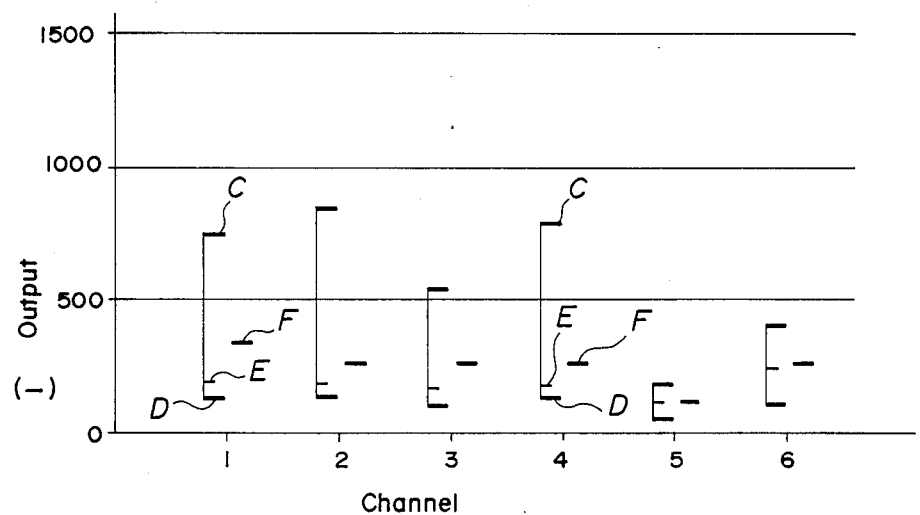
FIG. 30 is an explanatory diagram showing the state of monitoring the computed characteristic value and present value.
Figure 31:
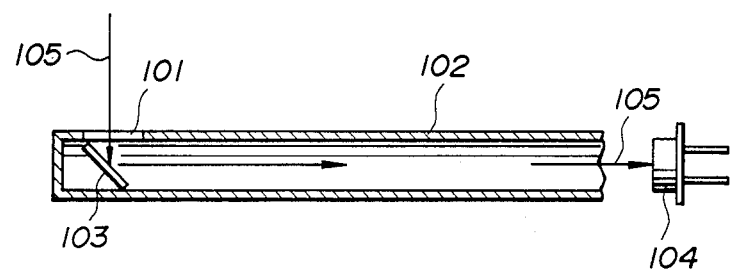
FIG. 31 shows a general structure of a conventional flame detector of optical type.
Figure 32:
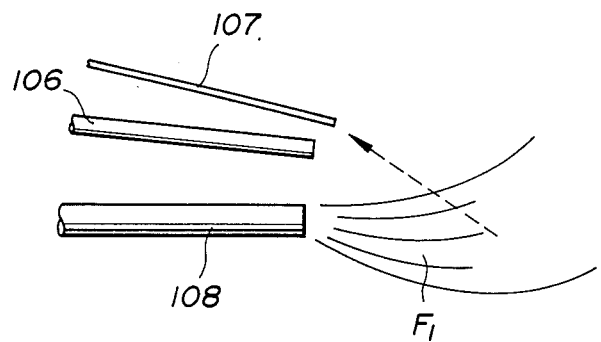
FIGS. 32 and 33 are explanatory diagrams of the state of detection of flame.
Figure 33:
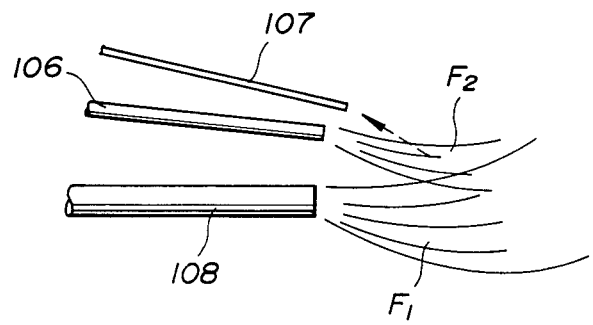

Now the third detection method will be described hereinbelow with reference to FIGS. 27 through 30. FIG. 27 is a characteristic diagram showing the relationship between the angle of the flame detector with respect the burner and the flame detection output. FIG. 28 is a characteristic diagram showing the relationship between the direction of interference flame and maximum value of interference output. FIG. 29 is a characteristic diagram showing the variation of detection output in connection with self-flame and interference flame with respect to lapse of time. FIG. 30 is an explanatory diagram showing the state of monitoring the computed characteristic value and present value.

Depending on the sort of a main burner the region where flame is formed is sometimes biased in one or more directions oriented to the periphery of the flame. On the other hand, when the detector head 1 is once pulled out for maintenance and checking and is then inserted again, the angle of the detector head 1 with respect to the burner (flame) may be different from before.

FIG. 27 is a diagram showing flame detection output characteristic obtained when the angle of the flame detector with respect to the burner (flame) is changed in various ways using a main burner of the type whose flame forming region is biased into two directions oriented to the periphery of the flame. As is apparent from this diagram the detection output drastically varies depending on the angle of the detector head 1 such that detection output is hardly obtaiend at particular angles. Although the characteristic shown in FIG. 27 is resulted from a specific burner having directivity in the flame forming region, the detection output varies when the mounting angle of the detector head is changed even in normal burners having no such directivity. Therefore, in the case of flame detection by watching the self-flame, the mounting angle of the detector head 1 has to be accurately adjusted so that a large detection output is ensured, and therefore troublesome operation is required.

FIG. 28 shows the influence from an adjacent burner in the case that a large number of main burners are used where each main burner is of the type that the flame forming region is biased to two radial directions. This influence from an adjacent burner is obtained through a test carried out in connection with two cases that the direction of adjacent main burners is selected so that the magnitude of interference is maximum and minimum respectively. In this test, a maximum value of an average value obtained when only an adjacent burner is in combustion state.

In FIG. 28, the reference ○ indicates a detection output from the visible light sensitive element of 0°, the reference ● indicates a detection output from the infrared light sensitive element of 0°, the reference △ indicates a detection output from the visible light sensitive element of 15°, the reference ▲ indicates a detection output from the infrared light sensitive element of 15°, the reference □ indicates a detection output from the visible light sensitive element of 30°, and the reference ■ indicates a detection output from the infrared light sensitive element of 30°.

As is apparent from this diagram, it can be recognized that each of the minimum value and the maximum value in the interference output is substantially the same throughout both channels.

FIG. 29 is a diagram showing the state of variation in detection output of self-flame to be detected and interference flame from close or adjacent burners caused form secular change. When a burner is used for a long period of time, the amount of light, namely the detection output, gradually drops as time goes due to various reasons such as a choked tip of the burner. Under such condition, when only the self-flame is watched, the choked tip of the burner or the like directly affects the drop of the detection output as indicated by a curve A whose lowering slope is sharp. On the contrary, the interference flame caused from surrounding or adjacent burners does not drop uniformly although the light amount of respective burners drops. In other words, the light amount dropping state throughout various burners is different. Since the light from respective flames optically interfere with each other although each light amount drops due to secular change, the drop in intensity of overall interference light is extremely gentle as indicated by a curve B.

The third detection method is based on the idea that it is advantageous, in view of detection accuracy, to determine the presence or absence of flame using data of interference light whose light amount varies a little rather than determining the presence or absence of flame using data of self-flame having many variation factors and obtaining threshold and deviation from such data.

FIG. 30 is an explanatory diagram showing a state of monitoring characteristic value computed through the third detection method and present value. As shown in FIG. 30, six channels are shown where level C indicats a maximum value of computed interference values, level D indicates a minimum value of computed interference values, level E indicates an average value of interference values, and level F indicates a present value.

When the present value (level F) exceeds the maximum value (level C) of the interference values, it is determined as a combustion state, and on the other hand, when the former is below the latter, it is determined as an extinction state.

In this third detection method, the maximum value, the minimum value and the average value of the interference values are obtained through self-learning with data being taken and the obtained values are stored in the memory in advance. Therefore, the stored characteristic values are read out to compute the interference light level (present value) presently detected.

According to the third detection method respective channels are weighted in advance in accordance with conditions of combustion, such as the sort of fuel used. Then after the determination of combustion or extinction in each channel, overall determination of the presence or absence of flame is made by adopting the determination as far as given point in the order of the magnitude of above-mentioned weighting.

The flame detecting apparatus according to the present invention can be used for not only the determination of the presence or absence of flame but also for monitoring the relationship between the operating condition of a boiler and a combustion state of a burner.

The above-described embodiment is just an example of the present invention, and therefore, it will be apparent for those skilled in the art that many modifications and variations may be made without departing from the scope of the present invention.

What is claimed is:

1. Apparatus for detecting flame for use with a burner, comprising:
   (a) a light-taking head having a fiber supporting member, a plurality of light-taking optical fibers supported by said fiber supporting member so that respective front ends of said light-taking optical fibers have different directions of fields of vision, and a protecting pipe for receiving said light-taking fibers, said fiber supporting member having means for guiding front end portions of said light-taking optical fibers so that said different directions have different angles with respect to a reference line, said front end portions of said light-taking optical fibers respectively extending radially outwardly with different angles from said reference line;

(b) photosensitive element means responsive to optical signals fed from said light-taking optical fibers for converting said optical signals into electrical signals, said photosensitive element means having a plurality of pairs of photosensitive elements where the number of the pairs equals the number of said plurality of light-taking optical fibers, said photosensitive elements in each pair having different sensitive wavelength ranges;

(c) a plurality of optical fibers for transmitting said optical signals from said light-taking head to said photosensitive elements, said plurality of optical fibers being respectively connected to said plurality of light-taking optical fibers; and (d) a flame detecting unit responsive to said electrical signals.

2. Apparatus as claimed in claim 1, further comprising cooling means for flowing cooling air via a space made between said fiber supporting member and said protecting pipe.

3. Apparatus for detecting flame for use with a burner, comprising:

(a) a light-taking head having a fiber supporting member, a plurality of light-taking optical fibers supported by said fiber supporting member so that respective front ends of said light-taking optical fibers have different directions of fields of vision, a protecting pipe for receiving said light-taking fibers, and a cap-like protecting member arranged to cover a front end of said light-taking head, a slit being made in said protecting member at one end facing a detection surface of said light-taking head;

(b) cooling means which supplies cooling air from a rear portion of said light-taking head so that said cooling air flows through a space between said light-taking head and said projecting member to gush out from said slit;

(c) photosensitive element means responsive to optical signals from said light-taking optical fibers for converting said optical signals into electrical signals, said photosensitive element means having a plurality of pairs of photosensitive elements where the number of the pairs equals the number of said plurality of light-taking optical fibers, said photosensitive elements in each pair having different sensitive wavelength ranges;

(d) a plurality of optical fibers for transmitting said optical signals from said light-taking head to said photosensitive elements, said plurality of optical fibers being respectively connected to said plurality of light-taking optical fibers; and (e) a flame detecting unit responsive to said electrical signals.

4. Apparatus as claimed in claim 1, wherein said protecting pipe comprises at least an outer cylinder and an inner cylinder to form a double-tube structure, the outer surface of said inner cylinder having a mirror finished surface so as to reflect heat rays.

5. Apparatus as claimed in claim 1 or 2, wherein said protecting pipe comprises at least an outer cylinder and an inner cylinder to form a double-tube structure, and a heat insulating layer provided between said outer and inner cylinders.

6. Apparatus as claimed in claim 1, wherein said light-taking optical fibers have no protecting layer made of an organic material.

7. Apparatus as claimed in claim 1, further comprising a plurality of junction optical fibers respectively coupled to said plurality of optical fibers, the diameter of cladding of each of said light-taking optical fibers being different from the diameter of a cladding of each of said junction optical fibers coupled to said light-taking optical fibers.

8. Apparatus as claimed in claim 7, wherein the diameter of a cladding of each of said light-taking optical fibers is larger than the diameter of a cladding of each of said junction optical fibers.

9. Apparatus for detecting flame for use with a burner comprising:

(a) a light-taking head having a fiber supporting member, a plurality of light-taking optical fibers supported by said fiber supporting member so that respective front ends of said light-taking optical fibers have different directions of fields of vision, and a protecting pipe for receiving said light-taking fibers, a plurality of front end supporting grooves being made in said fiber supporting member at its front end such that said plurality of front end supporting grooves are inclined from each other so that longitudinal directions of said front end supporting grooves have different angles with respect to a reference line, front end portions of said front ends of said light-taking optical fibers being respectively received in said front end supporting grooves;

(b) photosensitive element means responsive to optical signals fed from said light-taking optical fibers for converting said optical signals into electrical signals, said photosensitive element means having plurality of pairs of photosensitive elements where the number of the pairs equals the number of said plurality of light-taking optical fibers, said photosensitive elements on each pair having different sensitive wavelength ranges;

(c) a plurality of optical fibers for transmitting said optical signals from said light-taking head to said photosensitive elements, said plurality of optical fibers being respectively connected to said plurality of light-taking optical fibers; and (d) a flame detecting unit responsive to said electrical signals.

10. Apparatus as claimed in claim 9, wherein said front end supporting grooves have different depths such that the difference in depth is equal to or more than the outer diameter of each of said light-taking optical fiber.

11. Apparatus as claimed in claim 1, wherein said each pair of photosensitive elements comprises a visible light sensitive element and an infrared light sensitive element.

12. Apparatus for detecting flame for use with a burner, comprising:

(a) a light-taking head having a fiber supporting member, a plurality of light-taking optical fibers supported by said fiber supporting member so that respective front ends of said light-taking optical fibers have different directions of fields of vision, and a protecting pipe for receiving said light-taking fibers;

(b) photosensitive element means responsive to optical signals fed from said light-taking optical fibers for converting said optical signals into electrical signals, said photosensitive element means having a plurality of pairs of photosensitive elements where the number of the pairs equals the number of said plurality of light-taking optical fibers, said photosensitive elements in each pair having different sensitive wavelength ranges;

(c) a plurality of optical fibers for transmitting said optical signals from said light-taking head to said photosensitive elements, said plurality of optical fibers being respectively connected to said plurality of light-taking optical fibers; and (d) a flame detecting unit responsive to said electrical signals and comprising a computing unit which computes a characteristic reference value on the basis of said optical signals from said light-taking head, and a comparison-determination unit which compares actually measured characteristic value on the basis of said optical signals with said characteristic reference value set by said computing unit and determines the state of the flame.

13. Apparatus as claimed in claim 12, further comprising means for producing valve open-close signal indicating the state of opening and closing of a main valve of said burner, said computing unit being arranged to that said characteristic reference value is set through learning.

14. Apparatus as claimed in claim 12 or 13, wherein said characteristic reference value computed by said computing unit is probability distribution characteristic indicative of the relationship between probability distribution of the presence or absence of flame and amount of light, said comparison-determination unit being arranged to determine the presence or absence of flame using said probability distribution characteristic.

15. Apparatus as claimed in claim 12 or 13, wherein said characteristic reference value computed by said computing unit comprises threshold for the amount of light of flame to be detected, its deviation, interference value of amount of light from adjacent flames and its deviation, said comparison-determination unit being arranged to determine the presence or absence of flame by determining whether the measured amount of light from said light-taking head is within said deviation.

16. Apparatus as claimed in claim 12, wherein said characteristic reference value computed by said computing unit is a maximum value of an interference value of the amount of light of adjacent flames, said comparison-determination unit being arranged to determine the presence or absence of flame by determining whether the measured amount of light from said light-taking head exceeds said maximum value or not.

* * * * *